United States Patent
DeVries et al.

(10) Patent No.: US 9,127,918 B2
(45) Date of Patent: Sep. 8, 2015

(54) DISTRIBUTED ORDNANCE SYSTEM, MULTIPLE STAGE ORDNANCE SYSTEM, AND RELATED METHODS

(75) Inventors: Derek R. DeVries, Farr West, UT (US); Brent D. Madsen, Providence, UT (US); Eldon C. Peterson, North Logan, UT (US); Donald L. Jackson, West Jordan, UT (US); William W. Thorup, West Jordan, UT (US)

(73) Assignee: ALLIANT TECHSYSTEMS INC., Arlington, VA (US)

( * ) Notice: Subject to any disclaimer, the term of this patent is extended or adjusted under 35 U.S.C. 154(b) by 164 days.

(21) Appl. No.: 13/608,824

(22) Filed: Sep. 10, 2012

(65) Prior Publication Data

US 2014/0069289 A1    Mar. 13, 2014

(51) Int. Cl.
   *F42B 15/12*    (2006.01)
   *F42B 15/01*    (2006.01)
   *F02K 9/95*    (2006.01)
   *F42B 15/36*    (2006.01)

(52) U.S. Cl.
   CPC . *F42B 15/01* (2013.01); *F02K 9/95* (2013.01); *F42B 15/12* (2013.01); *F42B 15/36* (2013.01); *Y10T 29/49764* (2015.01)

(58) Field of Classification Search
   USPC .................. 361/247, 248; 102/217, 202, 200
   See application file for complete search history.

(56) References Cited

U.S. PATENT DOCUMENTS

| | | | |
|---|---|---|---|
| 3,142,959 A | 8/1964 | Klein | |
| 4,391,195 A * | 7/1983 | Shann | 102/201 |
| 4,586,437 A | 5/1986 | Miki et al. | |
| 4,602,565 A | 7/1986 | MacDonald et al. | |
| 4,635,552 A | 1/1987 | Battle | |
| 5,070,789 A | 12/1991 | True et al. | |
| 5,444,598 A | 8/1995 | Aresco | |
| 5,912,428 A | 6/1999 | Patti | |
| 6,295,923 B1 * | 10/2001 | Berger | 101/93.18 |

(Continued)

FOREIGN PATENT DOCUMENTS

| | | |
|---|---|---|
| WO | 9836949 A1 | 8/1998 |
| WO | 2007143759 A1 | 12/2007 |
| WO | 2010117395 A1 | 10/2010 |

OTHER PUBLICATIONS

International Search Report for International Application No. PCT/US2013/058902 dated Jun. 6, 2014, 4 pages.

(Continued)

*Primary Examiner* — Thienvu Tran
*Assistant Examiner* — Angela Brooks
(74) *Attorney, Agent, or Firm* — TraskBritt

(57) ABSTRACT

A distributed ordnance system comprises a plurality of ordnance controllers and a plurality of firing units. Each ordnance controller of the plurality of ordnance controllers may be operably coupled with at least one firing unit of the plurality of firing units. Each ordnance controller may be configured to provide power signals to the at least one firing unit coupled therewith, and communicate with the at least one firing unit for initiation of an ordnance event. A multiple-stage ordnance system may comprise a first stage and a second stage that each include an ordnance controller configured to control operation of an ordnance event, and at least one firing unit to initiate the ordnance event. Related methods for constructing a multiple-stage ordnance control system and controlling initiation of an energetic material are also disclosed.

22 Claims, 4 Drawing Sheets

(56) References Cited

U.S. PATENT DOCUMENTS

| | | | |
|---|---|---|---|
| 6,584,907 B2* | 7/2003 | Boucher et al. | 102/217 |
| 6,634,298 B1 | 10/2003 | Denney | |
| 6,718,881 B2* | 4/2004 | Rauscher, Jr. | 102/217 |
| 6,889,610 B2 | 5/2005 | Boucher et al. | |
| 6,992,877 B2 | 1/2006 | DeVries et al. | |
| 7,261,028 B2* | 8/2007 | Devries et al. | 89/1.1 |
| 7,301,750 B2 | 11/2007 | DeVries et al. | |
| 7,530,311 B2* | 5/2009 | Koekemoer et al. | 102/215 |
| 7,752,970 B2* | 7/2010 | Nelson et al. | 102/215 |
| 8,468,944 B2* | 6/2013 | Givens et al. | 102/275.11 |
| 2003/0075069 A1* | 4/2003 | Boucher et al. | 102/217 |
| 2003/0159609 A1 | 8/2003 | Rauscher, Jr. | |
| 2005/0038592 A1* | 2/2005 | de Sylva | 701/101 |
| 2005/0150998 A1* | 7/2005 | Devries et al. | 244/3.15 |
| 2008/0092765 A1 | 4/2008 | Shiau et al. | |
| 2011/0277620 A1* | 11/2011 | Havran et al. | 89/1.14 |

OTHER PUBLICATIONS

Written Opinion of the International Searching Authority for International Application No. PCT/US2013/058902 dated Jun. 6, 2014, 4 pages.

* cited by examiner

DISTRIBUTED ORDNANCE SYSTEM, MULTIPLE STAGE ORDNANCE SYSTEM, AND RELATED METHODS

CROSS REFERENCE TO RELATED APPLICATION

This application is related to U.S. patent application Ser. No. 13/608,571, filed Sep. 10, 2012, and titled "High Voltage Firing Unit, Ordnance System, and Method of Operating Same," the disclosure of which is incorporated herein by this reference in its entirety.

FIELD

The disclosure relates generally to ordnance systems. More specifically, the disclosure relates to a distributed ordnance system having a plurality of ordnance controllers for controlling a plurality of individually addressable firing units.

BACKGROUND

Ordnance systems may employ firing units to initiate energetic materials (e.g., explosive, pyrotechnic, pyrotechnic, fuels, etc.) for initiation (e.g., detonation) of a device or system. Examples of such systems include automated weapon systems, aerospace systems such as rocket motors, airbag initiators, parachute harness connectors, and other systems. A firing unit containing an electronics assembly and an initiator/detonator may be utilized to initiate downstream energetic materials. Energetic materials, such as explosive materials, pyrotechnic materials, propellants and fuels, may be initiated with a variety of different types of energy including heat, chemical, mechanical, electrical, or optical. For example, energetic materials may be ignited by flame ignition (e.g., fuzes or ignition of a priming explosive), impact (which often ignites a priming explosive), chemical interaction (e.g., contact with a reactive or activating fluid), or electrical ignition. Electrical ignition may occur in one of at least two ways. For example, a bridge element may be heated until auto ignition of the adjacent energetic material occurs, or the bridge element may be exploded by directly detonating the adjacent energetic material. Providing a proper signal structure may cause a firing unit to initiate a pyrotechnic or explosive charge, which may then activate an ordnance device for a specific motor event. These motor events may include motor initiation, stage separation, thrust vector control activation, payload faring ejection and separation, etc.

Conventional ordnance systems, such as those employed in launch vehicles, may include a large number of electronic component designs, which may result in numerous electrical cabling that may be complex to route and may be relatively heavy. As a result, integration of such conventional ordnance systems during construction of a launch vehicle may be very time consuming and expensive.

In addition, conventional ordnance systems may not be conducive (or even configured for) an end-to-end operational system check during construction or use. Testing of conventional ordnance systems may rely on statistical methods to satisfy reliability requirements rather than an internal built-in-in testing to assess and provide an understanding of a devices complete health or status at any given point in time.

DETAILED DESCRIPTION

Figure 1:
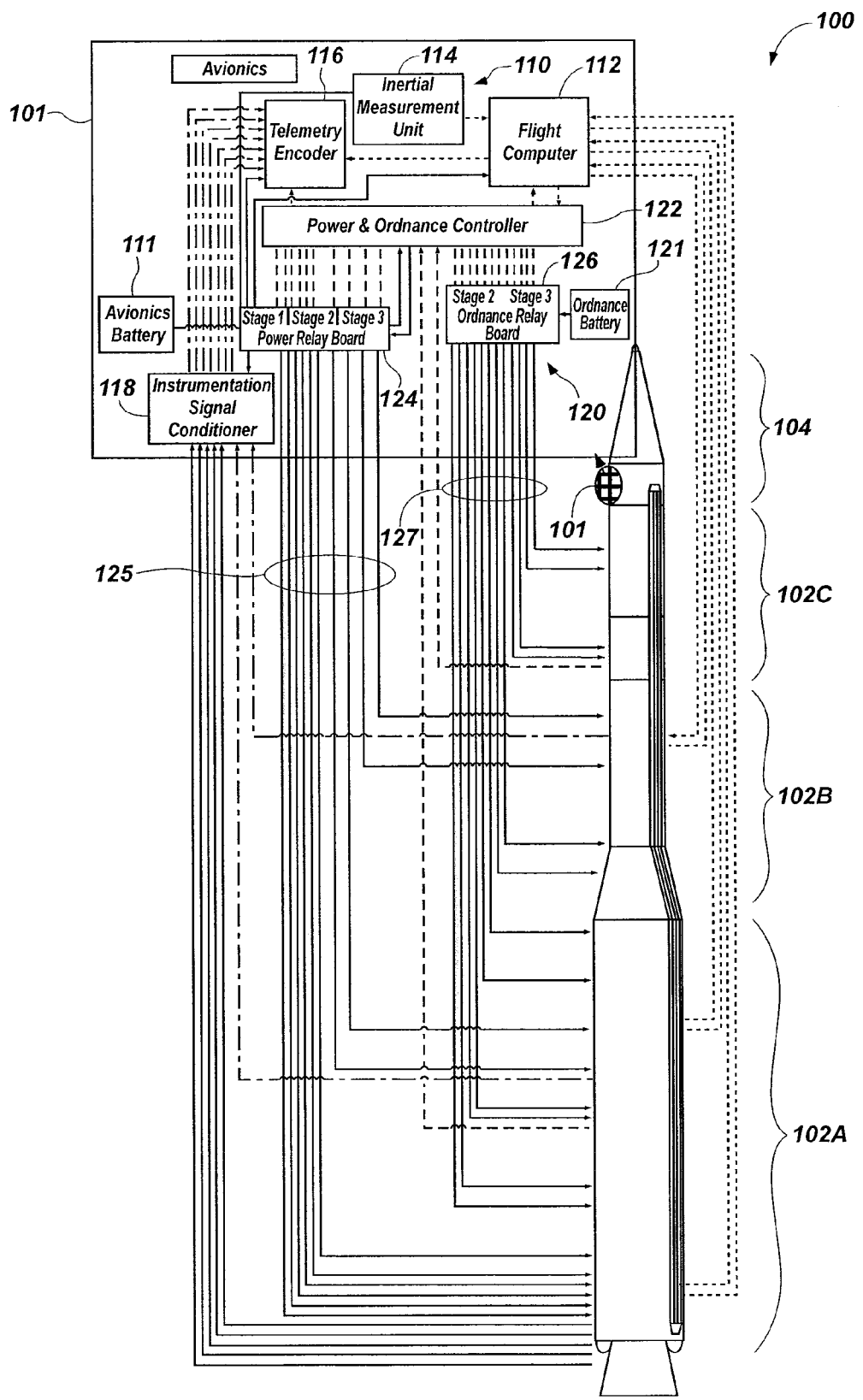
FIG. 1 is a multiple-stage rocket motor having a conventional avionics control system and ordnance control system.

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the claimed invention is defined only by the appended claims and their legal equivalents.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application-Specific Integrated Circuit (ASIC), a Field-Programmable Gate Array (FPGA) or other programmable logic device, a controller, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Embodiments of the present disclosure include ordnance systems that may be integrated or utilized with various types of airframes including rockets, satellites, missiles, launch vehicles, or other such devices where ordnances are utilized to initiate various ordnance events. Such ordnances may include, for example, ignition devices, exploding bolts, actuators, gas generators, separation devices, pressure equalization and ventilation devices, and other similar devices, which are individually and collectively referred to hereinafter as "ordnances."

FIG. 1 is a multiple-stage rocket motor 100 having a conventional avionics control system 110 and ordnance control system 120. The ordnance control system 120 may be integrated with the avionics control system 110, such that the ordnance control system 120 and the avionics control system 110 are located together (indicated by oval 101, which is enlarged as box 101 to provide the additional detail shown). In addition, conventionally the ordnance control system 120 and the avionics control system 110 are positioned at a location that is separate from individual stages 102A, 102B, 102C, of the multiple-stage rocket motor 100. For example, as shown in FIG. 1, the electronics of the avionics control system 110 and the ordnance control system 120 are located near the cone 104 of the multiple-stage rocket motor 100.

The avionics control system 110 is configured to manage the flight controls for the multiple-stage rocket motor 100. The avionics control system 110 may include various control units, sensors, monitoring systems, etc., such as a flight computer 112, an inertial measurement unit 114, telemetry encoder 116, and instrumentation signal conditioner 118. The ordnance control system 120 may be configured to provide power and control for the various ordnance units (not shown) of the stages 102A, 102B, 102C. The ordnance control system 120 may include power and ordnance controller 122, power relay board 124, and ordnance relay board 126. Power supplies, such as avionics battery 111 and ordnance battery 121 may provide power for operation of the various components of the avionics control system 110 and the ordnance control system 120.

As shown in FIG. 1, power signals 125 and control signals 127 for the ordnance units are conventionally generated on individual wires. For example, each individual power signal 125 may be transmitted over a separate wire to an individual ordnance unit to provide power thereto. Likewise, each individual control signal 127 may be analog signals transmitted over a separate wire instructing individual components how to perform. Such a configuration may result in complicated cabling paths for the power distribution and control systems throughout the various stages 102A, 102B, 102C of the multiple-stage rocket motor 100, which may result in implementation and spacing difficulties, noise issues, complexity in timing ordnance firing events as well as timing for other events, weight issues, among other potential issues recognized by the inventors.

Figure 2:
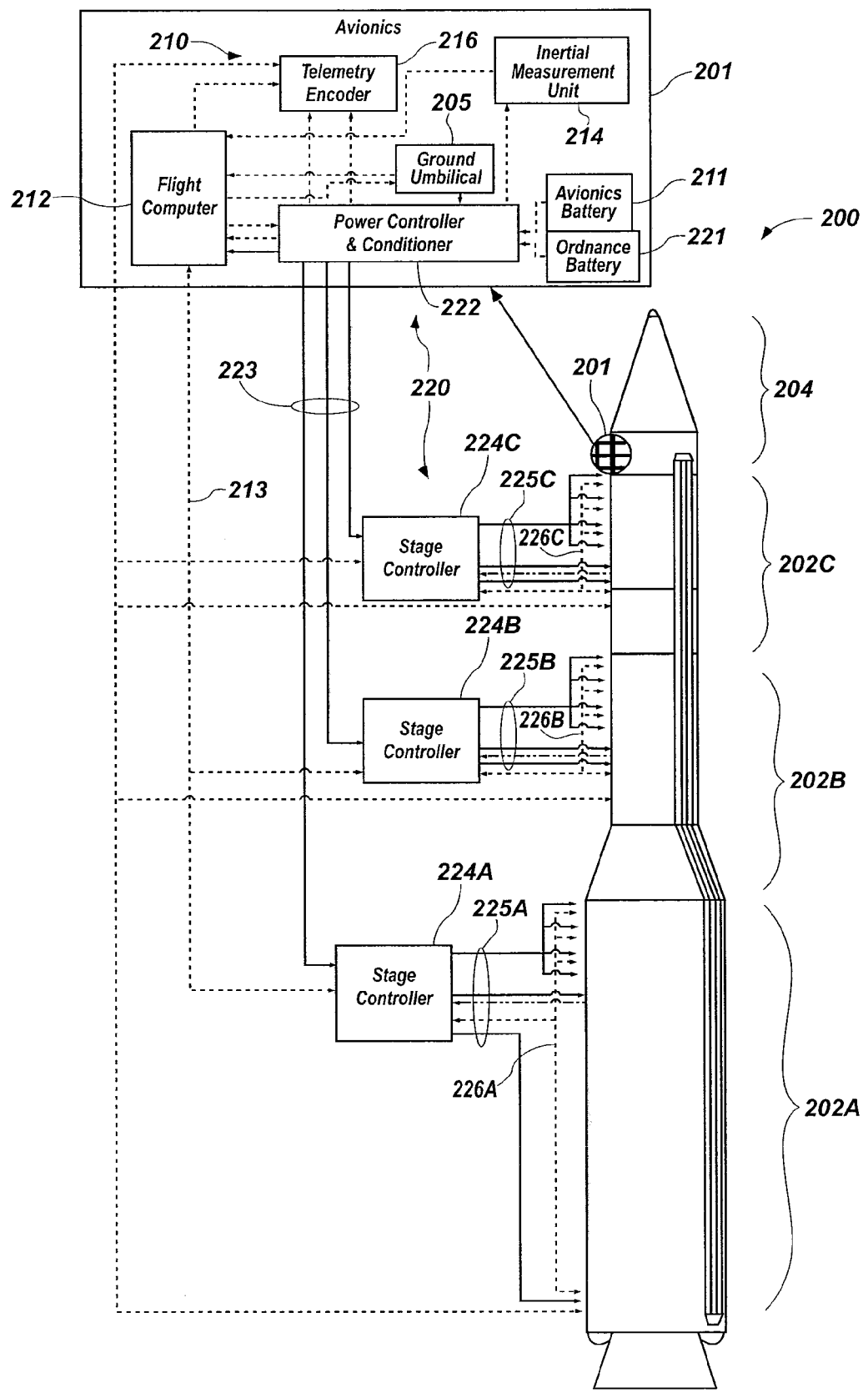
FIG. 2 is a multiple-stage rocket motor having an avionics control system and ordnance control system according to an embodiment of the present disclosure.

FIG. 2 is a multiple-stage rocket motor 200 having an avionics control system 210 and ordnance control system 220 according to an embodiment of the present disclosure. The ordnance control system 220 may include at least some components that are separate from the avionics control system 210, such as being distributed throughout the various stages 202A, 202B, 202C of the multiple-stage rocket motor 200. As indicated by oval 201 (which is enlarged as box 201 to provide the additional detail shown), the electronics of the avionics control system 210 is located near the cone 204 of the multiple-stage rocket motor 200. As shown in FIG. 2, some of the components associated with the ordnance control system 220 may also be located near the cone 204 along with the avionics control system 210.

The avionics control system 210 may be configured to manage at least some of the flight controls of the multiple-stage rocket motor 200. The avionics control system 210 may include various control units, sensors, monitoring systems, etc., such as a flight computer 212, an inertial measurement unit 214, and a telemetry encoder 216. The avionics control system 210 may also include other components not specifically shown in FIG. 2, such as an instrumentation signal conditioner (FIG. 1). The ordnance control system 220 may be configured to provide power and control for the various ordnance units (not shown) of the stages 202A, 202B, 202C. The ordnance control system 220 may include power controller and conditioner 222, and a plurality of stage controllers 224A, 224B, 224C that are distributed among the plurality of stages 202A, 202B, 202C of the multiple-stage rocket motor 200. Power components, such as avionics battery 211, ordnance battery 221, and ground umbilical 205 may be used to provide power for operation of the various components of the avionics control system 210 and the ordnance control system 220.

The plurality of stages 202A, 202B, 202C may be referred to individually as a first stage 202A, a second stage 202B, and a third stage 202C. Similarly, other components associated with each stage may be referred to with a similar alphanumeric designation (i.e., 2##A, 2##B, 2##C). Each stage 202A, 202B, 202C may have its own ordnance controller 224A, 224B, 224C coupled to one or more firing units (not shown), which may be used for igniting an energetic material to which it is associated. Because the ordnance controllers 224A, 224B, 224C are associated with its own respective stage 202A, 202B, 202C, the ordnance controllers 224A, 224B, 224C will also be referred to herein as "stage controllers."

The stage controllers 224A, 224B, 224C are operably coupled with the flight computer to communicate data communication signals 213 therebetween, and the power controller and conditioner 222 to receive power signals 223. Although shown as separate lines, the data communication signals 213 and the power signals 223 may be coupled to the stage controllers 224A, 224B, 224C through a common bus architecture. In addition, in some embodiments, the stage controllers 224A, 224B, 224C may be coupled in parallel through individual power lines from the power controller and conditioner 222 to receive its power signal 223. In some embodiments, the stage controllers 224A, 224B, 224C may be coupled in parallel through the same power line from the power controller and conditioner 222 that is tapped off of to receive its power signal 223. In some embodiments, the stage controllers 224A, 224B, 224C may include a safety plug (not shown) that the power line from the power controller and conditioner 222 may pass through to enable an individual stage controller (e.g., third stage controller 224C) to disable power to itself, as well as to the stage controllers downstream (e.g., second stage controller 224B, first stage controller 224A). Such a configuration will be described more fully below with respect to FIGS. 3 and 4.

The stage controllers 224A, 224B, 224C may further be configured to generate respective power signals 225A, 225B, 225C, and communication data signals 226A, 226B, 226C for enabling operation to one or more firing units. The stage controllers 224A, 224B, 224C may further be configured to manage certain flight controls of its stage, such as thrust vector control (TVC) commands of a stage nozzle actuation system, collecting instrumentation data, etc. As a result, the flight computer 212 may send some commands to the stage controllers 224A, 224B, 224C to initiate certain flight controls, but the stage controllers 224A, 224B, 224C may include a processor to locally implement the flight controls, as well as collect and pass information back to the flight computer 212. Thus, each stage controller 224A, 224B, 224C may be essentially autonomous for controlling the various functions for its stage 202A, 202B, 202C responsive to an initial command from the flight computer 212. In some embodiments, one or more of the stage controllers 224A, 224B, 224C may only perform ordnance control functions rather than both ordnance control and flight control functions. For example, the third stage 202C (which, in FIG. 2, is the stage that is attached to the cone 204) may have its flight controls managed by the flight computer 212 because of the close proximity and being essentially part of the same stage. In such an embodiment, the third stage controller 224C may have a more simple configuration than the other stage controllers 224A, 224B, while in some embodiments, each of the stage controllers 224A, 224B, 224C may be configured the same, but may operate differently according to the wiring, or instructions received from the flight computer 212.

Having some of the functions of the ordnance control system 220 and the avionics control system 210 distributed down to each stage 202A, 202B, 202C may provide benefits over conventional systems, such as a reduced complexity in wiring, improved safety features, and other efficiencies in construction and use. For example, distributing some functions associated with the ordnance control system 220 and the avionics control system 210 may contribute to components (and therefore also the weight thereof) being distributed throughout the multiple-stage rocket motor 200 rather than being located at a single location near the cone 204. As a result, as stages 202A, 202B, 202C are used and dropped off the multiple-stage rocket motor 200, the electronics that were associated therewith also drop off Because such electronics also drop off with the stages 202A, 202B, 202C, the weight associated is no longer part of the multiple-stage rocket motor 200, the result of which may be an increased payload capability to reach orbit, or an increased range for a given volume of propellant in the motor. In addition, having a distributed common bus architecture may provide additional benefits in initial construction by having stage controllers 224A, 224B, 224C that are essentially "plug and play" modules. As will be discussed further below, each stage 202A, 202B, 202C may be wired individually stage by stage (e.g., from the bottom up) rather than all wiring being performed at the end when the stages 202A, 202B, 202C are all connected.

Each of the stage controllers 224A, 224B, 224C may be addressable such that when a command is given on the common bus, the appropriate stage controller 224A, 224B, 224C responds to the command even though each stage controller 224A, 224B, 224C received the command. Data communication signals 213 may be communicated with over a variety of communication bus protocols, such as a controller area network (CAN), Ethernet, RS422, RS232, RS485, etc. As a result, the stage controllers 224A, 224B, 224C may send and receive messages, which may be communicated serially or in parallel depending on the protocol used. A message may include information such as the priority of the message, an address of the intended stage controller 224A, 224B, 224C, and/or the firing units 330A, 330B, 330C (FIG. 3), and the desired data or command to be conveyed. The stage controllers 224A, 224B, 224C may further be configured to handle up-stream interfaces to mission computers, power distribution systems, and other macro-systems as needed.

Figure 3:
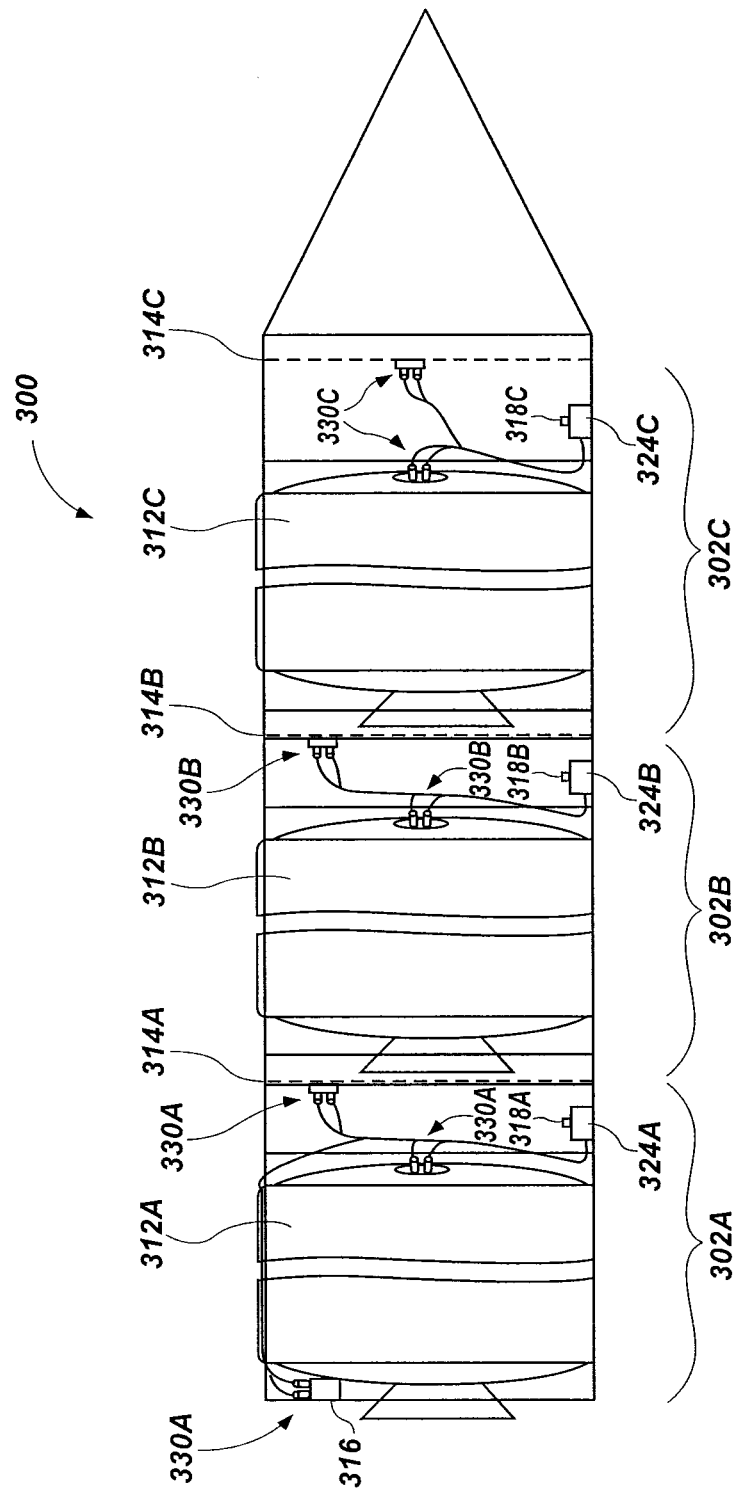
FIG. 3 is a cutaway side view of a rocket motor that includes an ordnance system including at least one firing unit according to an embodiment of the present disclosure.

FIG. 3 is a cutaway side view of a rocket motor 300 that includes an ordnance system including at least one firing unit according to an embodiment of the present disclosure. In particular, the rocket motor 300 is a multiple-stage rocket motor. In other words, the rocket motor 300 includes a plurality of stages 302A, 302B, 302C, each of which may include a propellant acting as the motor 312A, 312B, 312C for the respective stage 302A, 302B, 302C. The plurality of stages 302A, 302B, 302C may be referred to individually as a first stage 302A, a second stage 302B, and a third stage 302C. Similarly, other components associated with each stage 302A, 302B, 302C may be referred to with a similar alphanumeric designation (i.e., 3##A, 3##B, 3##C).

Each stage 302A, 302B, 302C may have its own ordnance controller 324A, 324B, 324C coupled to one or more firing units 330A, 330B, 330C, which may be used for igniting an energetic material to which it is associated. For example, the firing units 330A, 330B, 330C may be used to ignite energetic material associated with the motors 312A, 312B, 312C, separation joints 314A, 314B, 314C for separating the stages 302A, 302B, 302C after use of the respective stage 302A, 302B, 302C during flight, other payload release mechanisms, one or more energy devices 316 (e.g., a battery, gas generator, etc.), thrusters, a mechanism for a thrust termination event, a destruct charge for a warhead or other destruct systems, etc. In other words, the firing units 330A, 330B, 330C may be used for initiating a variety of ordnance events. The energy device 316 is shown as being located on the first stage 302A; however, such an energy device 316 (or multiple energy devices) may be located on any of the stages 302A, 302B, 302C, or a combination thereof.

As an example, the firing units 330A, 330B, 330C may be configured as high voltage firing units (HVFU), low voltage firing units (LVFU), and other similar firing units used to energize an initiator to ignite an energetic material. An example of an HVFU, and its related components, is described in U.S. patent application Ser. No. 13/608,571, filed Sep. 10, 2012, and titled "High Voltage Firing Unit, Ordnance System, and Method of Operating Same," the disclosure of which is incorporated herein by this reference in its entirety, as is also described above.

Because the ordnance controllers 324A, 324B, 324C are configured to control operation of the firing units 330A, 330B, 330C for its associated stage 302A, 302B, 302C, each ordnance controller 324A, 324B, 324C may also be referred to as a "stage controller." In addition, the stage controllers 324A, 324B, 324C may be configured to manage certain flight controls for its stage 302A, 302B, 302C. For example, the stage controllers 324A, 324B, 324C may manage thrust vector control (TVC) commands, collect instrumentation data, etc. In some embodiments, flight controls may also be controlled by an avionics control system (FIG. 2), such that the ordnance controller 324A, 324B, 324C may merely be configured as an ordnance interface unit (OIU) that leaves the operation of the flight controls for its stage to the avionic control system.

The stage controllers 324A, 324B, 324C may be coupled to the avionics control system (FIG. 2) that acts as a host to control the stage controllers 324A, 324B, 324C. In general, the stage controllers 324A, 324B, 324C may receive common downstream commands, data handling, and power distribution from the avionics control system. For example, the avionics control system may provide overall control for which firing unit 330A, 330B, 330C to fire. The firing units 330A, 330B, 330C may be individually addressable and controllable from the avionics control system through the stage controllers 324A, 324B, 324C. As a result, the stage controllers 324A, 324B, 324C may be coupled with the avionics control system with a common bus, and the firing units 330A, 330B, 330C may be coupled to its respective stage controller 324A, 324B, 324C with a common bus.

Each of the stage controllers 324A, 324B, 324C may include a safety plug 318A, 318B, 318C. Each of the safety plugs 318A, 318B, 318C may be configured to manually disconnect power signals, such that the stage controllers 324A, 324B, 324C may not provide power to the firing units 330A, 330B, 330C as well as the other stage controllers 324A, 324B, 324C downstream. For example, disconnecting the first safety plug 318A may disconnect the power signals to the first stage controller 324A, such that the first stage controller 324A may not provide power to the firing units 330A of the first stage 302A. Disconnecting the second safety plug 318B may disconnect the power signals to the second stage controller 324B, such that the second stage controller 318B may not provide power to the firing units 330B of the second stage 302B. In addition, disconnecting the second safety plug 318B may further disconnect the power signals to the first stage controller 324A (and associated firing units 330A) because the first stage controller 324A is downstream from the second stage controller 324B. Thus, disconnecting the second safety plug 318B affects the power to the first stage 302A regardless of the status of the first safety plug 318A. Likewise, disconnecting the third safety plug 318C may disconnect the power signals to the third stage controller 324C, such that the third stage controller 324C may not provide power to the firing units 330C of the third stage 302C, as well as the second stage controller 324B and third stage controller 324C downstream. Stage controllers for additional stages, if present, may be have a similar affect for downstream stages.

As a result, the stage controllers 324A, 324B, 324C may be plug and play devices for each stage. When constructing a multiple stage device (e.g., multiple stage rocket motor 300) having a distributed ordnance control system, the device may be constructed and tested from bottom up. For example, the first stage 302A may be constructed with the first safety plug 318A disconnected. As a result, the components of the first stage 302A may be isolated from power sources. The components may be safely tested without power, after which the second stage 302B may be constructed with the second safety plug 318B disconnected. Because the second safety plug 318B being disconnected also disconnects power to the stages downstream (e.g., first stage 302A), the first safety plug 318A may be connected without power being provided to the first stage controller 324A. Likewise, after construction and testing of the second stage 302B is complete, the third stage 302C may be constructed and tested with the third safety plug 318C disconnected. Because the third safety plug 318C being disconnected also disconnects power to the stages downstream (e.g., first stage 302A, second stage 302B), the first safety plug 318A and the second safety plug 318B may be connected without power being provided to the first stage controller 324A and the second stage controller 324A. Thus, the safety plug (e.g., third safety plug 318C) of the top-most stage controller (e.g., third stage controller 324A) provides a manual safety plug for the entire stack of stage controllers 324A, 324B, 324C.

Such a stacked configuration may provide ease in constructing and testing the stages 302A, 302B, 302C, because wiring may need only to be connected to adjacent stages rather than being routed through the entire finished rocket motor 300 after all stages are constructed. As a result, stages 302A, 302B, 302C may be processed individually without regard for the status of the safety plugs for the stages below. In addition, the lower stages (e.g., 302A) may not require access points for the safety plugs (e.g., 318A) because the safety plugs (e.g., 318A) may be connected at an intermediate point of construction rather than at final construction of all stages. In operation, as the stages 302A, 302B, 302C are used up, and are dropped off during flight, the power load associated with that stage drops off without affecting the remaining stages.

Figure 4:
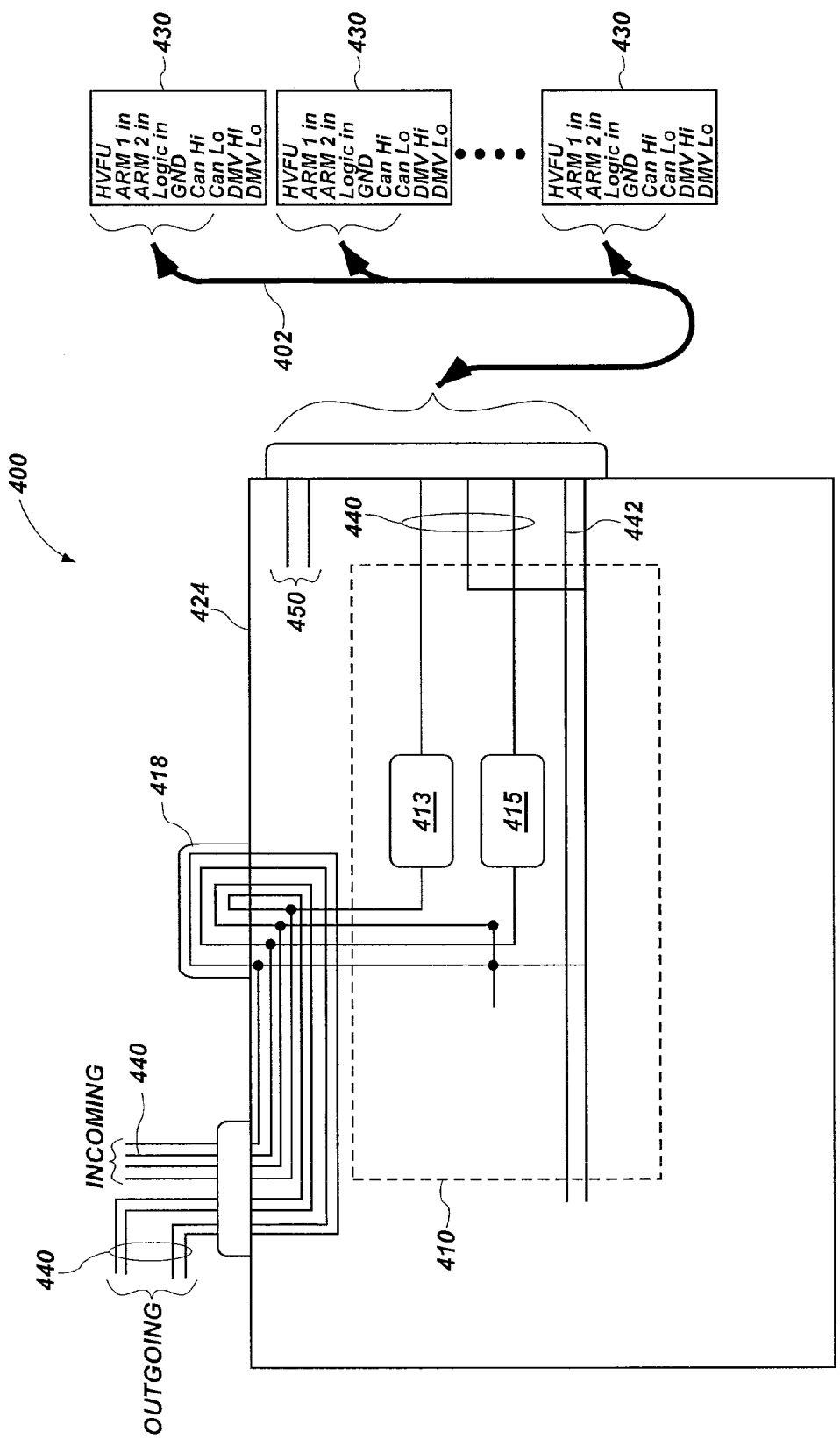
FIG. 4 is a schematic diagram of an ordnance system according to an embodiment of the present disclosure.

FIG. 4 is a schematic diagram of an ordnance system 400 according to an embodiment of the present disclosure. The ordnance system 400 may include an ordnance controller 424, which may be configured as a stage controller as described above. In addition, the ordnance system 400 may include one or more firing units 430 (e.g., HVFUs), which may be configured generally as described above. As shown in FIG. 4, the ordnance controller 424 may be coupled to a plurality of firing units 430 through common cabling 402. The common cabling 402 may include wiring for electronic safe and arm (ESA) power signals 440 and a logic power signal 442.

The ordnance controller 424 may be serially coupled (e.g., stacked) with one or more additional ordnance controllers (not shown in FIG. 4) that are similarly configured. For example, the ordnance controller 424 may receive the ESA power signals 440 from another ordnance controller (incoming), pass the ESA power signals 440 through the safety plug 418, and pass the ESA power signals 440 to another ordnance controller (outgoing). As discussed with respect to FIG. 4, each ordnance controller 424 may be associated with a respective stage of a multiple-stage rocket for controlling the firing units 430 associated therewith. The safety plug 418 may be configured to manually disconnect the ESA power signals 440, which may disconnect power to the ordnance controller 424 as well as the other ordnance controllers downstream. As a result, the firing units 430 for the present stage and downstream stages may not be able to be armed or charged with the safety plug 418 disconnected.

If the ordnance controller 424 of FIG. 4 is the first stage controller 324A (FIG. 3), the outgoing ESA power signals 440 may be disconnected, because there is no downstream stage. The incoming ESA power signals 440 may be received from the second stage controller 324B (FIG. 3). If the ordnance controller 424 of FIG. 4 is the third stage controller 324C, the outgoing ESA power signals 440 may be connected to the second stage controller 324B. The incoming ESA power signals 440, however, may be received from the power controller and conditioner 222 (FIG. 2) rather than a previous stage.

The ordnance controller 424 may be configured to control generation of the ESA power signals 440, such as in response to control signals during an arming sequence. For example, the ordnance controller 424 may include control logic 410, which may include ESA arming power switches 413, 415, which may be enabled and disabled according to the desired timing for the arming sequence. The ordnance controller 424 may be configured to communicate data signals 450 with the firing units 430 over a digital bus to determine a status of the firing units 430 when determining the proper time to generate the ESA power signals 440. In some embodiments, the logic power signal 442 may be routed outside of the safety plug 418, such that the control and monitoring units of the firing units 430 may operate to monitor voltages and currents within the firing units 430 even in the absence of the ESA power signals 440.

The ordnance systems described herein may enable an electronic communication system that may replace conventional mechanical safe and arms, flexible confined detonating cords, thru-bulkhead initiators, lanyard pull initiators, and the like. As a result, there may be a reduction in complexity and reduced number of components, which may further result in lower cost, higher reliability, enhanced safety, lower electrical power requirements, and simplified vehicle integration. While reference is given to a distributed ordnance system being used within a multiple-stage rocket, other embodiments are also contemplated. For example, a distributed ordnance system may be employed in a variety of applications, such as in mining, drilling, demolition, among other applications in which it may be beneficial for an ordnance system to have ordnance controllers distributed to different areas (i.e., stages) relevant to a particular application.

CONCLUSION

In one embodiment, a distributed ordnance system is disclosed. The distributed ordnance system comprises a plurality of ordnance controllers and a plurality of firing units. Each ordnance controller of the plurality of ordnance controller is operably coupled with at least one firing unit of the plurality of firing units, is configured to provide power signals to the at least one firing unit coupled therewith, and is configured to communicate with the at least one firing unit for initiation of an ordnance event.

In another embodiment, a multiple-stage ordnance system is disclosed. The multiple-stage ordnance system comprises a first stage and a second stage. The first stage comprises a first ordnance controller configured to control operation of a first ordnance event within the first stage, and at least one first firing unit operably coupled with the first ordnance controller to initiate the first ordnance event. The second stage comprises a second ordnance controller configured to control operation of a second ordnance event within the second stage, and at least one second firing unit operably coupled with the second ordnance controller to initiate the second ordnance event.

In another embodiment, a method of constructing a multiple-stage ordnance control system is disclosed. The method comprises coupling a first ordnance controller with at least one first firing unit of a first stage having a first safety plug, testing components of the first stage with the first safety plug disconnected, coupling the first ordnance controller and the second ordnance controller, coupling a second ordnance controller with at least one second firing unit of a second stage having a second safety plug, and testing components of the second stage with the second safety plug disconnected and the first safety plug connected.

In another embodiment, a method for controlling initiation of an energetic material is disclosed. The method comprises sending a control signal over a common communication bus to a plurality of ordnance controllers operably coupled to a plurality of firing units configured to ignite the energetic material. The control signal includes a message including an address corresponding to the firing unit to be armed and charged. The method further comprises sending a power signal over a common power bus to the plurality of ordnance controllers. The plurality of ordnance controllers are further configured for providing the power signal to the firing unit to be armed and charged.

While the present disclosure has been described herein with respect to certain illustrated embodiments, those of ordinary skill in the art will recognize and appreciate that the disclosure is not so limited. Rather, many additions, deletions, and modifications to the illustrated and described embodiments may be made without departing from the scope of the disclosure. In addition, features from one embodiment may be combined with features of another embodiment while still being encompassed within the scope of the disclosure as contemplated by the inventors. Finally, the scope of the invention is defined only by the appended claims and their legal equivalents.

What is claimed is:

1. A distributed ordnance system, comprising: a plurality of ordnance controllers; and a plurality of firing units, each firing unit configured to receive a plurality of electronic safe and arm (ESA) power signals from an associated ordnance controller for both arming and charging the firing unit prior to discharge, wherein each ordnance controller of the plurality of ordnance controllers: is operably coupled with at least one firing unit of the plurality of firing units; is configured to provide the plurality of ESA power signals to the at least one firing unit coupled therewith; is configured to communicate with the at least one firing unit for initiation of an ordnance event; and includes a safety plug configured to manually disconnect the plurality of ESA power signals for the associated ordnance controller.

2. The distributed ordnance system of claim 1, wherein each ordnance controller is operably coupled with the at least one firing unit coupled therewith through a digital communication bus.

3. The distributed ordnance system of claim 2, wherein the digital communication bus has a communication bus protocol selected from the group consisting of a controller area network (CAN), Ethernet, RS422, RS232, and RS485.

4. The distributed ordnance system of claim 2, wherein at least one ordnance controller of the plurality of ordnance controllers is operably coupled to at least one additional firing unit of the plurality of firing units.

5. The distributed ordnance system of claim 2, wherein the plurality of ESA power signals and the digital communication bus are provided within common cabling.

6. The distributed ordnance system of claim 2, wherein the plurality of ordnance controllers are operably coupled to each other with a common bus from a main controller.

7. The distributed ordnance system of claim 6, wherein the common bus includes the plurality of ESA signals provided from the main controller to the plurality of ordnance controllers.

8. The distributed ordnance system of claim 6, wherein the common bus includes the digital communication bus provided from the main controller to the plurality of ordnance controllers.

9. The distributed ordnance system of claim 1, wherein the safety plug is configured to manually disconnect the plurality of ESA signals from downstream ordnance controllers of the plurality of ordnance controllers that are serially coupled to receive the plurality of ESA power signals from an upstream ordnance controller.

10. The distributed ordnance system of claim 1, wherein the plurality of firing units comprise a plurality of high voltage firing units.

11. A multiple-stage ordnance system, comprising:
a first stage, comprising: a first ordnance controller configured to control operation of a first ordnance event within the first stage; at least one first firing unit operably coupled with the first ordnance controller to initiate the first ordnance event; and a first safety plug configured to receive at least one electronic safe and arm (ESA) power signal and selectively provide the ESA power signal to the at least one first firing unit according to a state of a manual disconnect for the first safety plug; and a second stage, comprising: a second ordnance controller configured to control operation of a second ordnance event within the second stage; at least one second firing unit operably coupled with the second ordnance controller to initiate the second ordnance event; and a second safety plug configured to receive the at least one ESA power signal from the first stage, and selectively provide the ESA power signal to the at least one first firing unit according to a state of a manual disconnect for the second safety plug.

12. The multiple-stage ordnance system of claim 11, wherein each of the at least one first firing unit and the at least one second firing unit is individually addressable by the respective one of the first ordnance controller and the second ordnance controller.

13. The multiple-stage ordnance system of claim 11, wherein the first ordnance controller is further configured to manage flight controls for the first stage of a multiple-stage flight vehicle.

14. The multiple-stage ordnance system of claim 11, further comprising an avionics control system operably coupled with the first ordnance controller and the second ordnance controller over a common bus architecture.

15. The multiple-stage ordnance system of claim 14, further comprising a power controller and conditioner located proximate the avionics control system, the power controller and conditioner configured to generate the at least one ESA power signal to each of the first ordnance controller and the second ordnance controller.

16. The multiple-stage ordnance system of claim 15, wherein the first safety plug is further configured to selectively provide the at least one ESA power signal to the second safety plug of the second ordnance controller according to the state of the manual disconnect for the first safety plug.

17. A method of constructing a multiple-stage ordnance control system, the method comprising: coupling a first ordnance controller with at least one first firing unit of a first stage having a first safety plug; testing components of the first stage with the first safety plug manually disconnected; coupling the first ordnance controller and the second ordnance controller; coupling a second ordnance controller with at least one second firing unit of a second stage having a second safety plug; and testing components of the second stage with the second safety plug manually disconnected and the first safety plug connected.

18. The method of claim 17, wherein coupling the first ordnance controller and the second ordnance controller includes coupling at least one power signal line from the second safety plug to the first safety plug.

19. A method for controlling initiation of an energetic material, the method comprising: sending a control signal over a common communication bus to a plurality of ordnance controllers operably coupled to a plurality of firing units configured to ignite the energetic material, the control signal including a message including an address corresponding to the firing unit to be armed and charged; and sending a power signal over a common power bus to the plurality of ordnance controllers through safety plugs that correspond to an associated ordnance controller for manually disconnecting the power signal, the plurality of ordnance controllers further configured for providing the power signal to the firing unit to be armed and charged.

20. The method of claim 19, further comprising sending a fire command signal to the firing unit after being armed and charged.

21. The method of claim 20, further comprising releasing energy from an energy storage device of the firing unit to an initiator responsive to the fire command signal.

22. The method of claim 19, further comprising manually disconnecting the power signal via the associated safety plug for the ordnance controller of a first stage to disconnect the power signal from the first stage and other downstream stages.

* * * * *